United States Patent
Harayama et al.

(10) Patent No.: US 8,234,065 B2
(45) Date of Patent: Jul. 31, 2012

(54) VEHICLE NAVIGATION APPARATUS AND METHOD

(75) Inventors: Tomoya Harayama, Kariya (JP); Katsuhiro Ina, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1384 days.

(21) Appl. No.: 11/889,799

(22) Filed: Aug. 16, 2007

(65) Prior Publication Data

US 2008/0071474 A1    Mar. 20, 2008

(30) Foreign Application Priority Data

Sep. 19, 2006  (JP) ................. 2006-253058

(51) Int. Cl.
*G01C 21/00* (2006.01)

(52) U.S. Cl. ........................ 701/446; 340/901

(58) Field of Classification Search .......... 701/206–211, 701/93, 96, 117, 400, 408, 409, 412, 414, 701/418–423, 428, 437, 444–448; 702/94; 340/901, 904, 905, 995.2, 988, 990; 73/178 R
See application file for complete search history.

(56) References Cited

U.S. PATENT DOCUMENTS

| | | | |
|---|---|---|---|
| 6,163,750 A | 12/2000 | Nojima | |
| 6,889,161 B2 * | 5/2005 | Winner et al. | 702/147 |
| 7,103,475 B2 * | 9/2006 | Irie | 701/211 |
| 7,953,546 B1 * | 5/2011 | Wall, III | 701/117 |
| 2005/0209776 A1 | 9/2005 | Ogino | |
| 2007/0032943 A1 * | 2/2007 | Okabe | 701/200 |

FOREIGN PATENT DOCUMENTS

| | | |
|---|---|---|
| JP | A-9-304102 | 11/1997 |
| JP | A-10-177699 | 6/1998 |
| JP | A-2003-050135 | 2/2003 |
| JP | A-2003-151080 | 5/2003 |
| JP | A-2005-165749 | 6/2005 |
| JP | A-2005-207999 | 8/2005 |
| JP | A-2005-241653 | 9/2005 |
| JP | A-2005-311584 | 11/2005 |

OTHER PUBLICATIONS

Office Action mailed Jan. 18, 2011 issued in corresponding JP patent application No. 2006-253058 (English translation enclosed).

* cited by examiner

*Primary Examiner* — Dalena Tran
(74) *Attorney, Agent, or Firm* — Posz Law Group, PLC

(57) ABSTRACT

A vehicle navigation apparatus includes an imaging device, a guidance point determining device, an object detecting device and a traveling guiding device. The imaging device takes an image of a periphery adjacent to a subject vehicle. The guidance point determining device determines the subject vehicle to be located at a traveling guidance point or not. The object detecting device detects a changing object by comparing two images of the periphery taken at a predetermined interval, when the guidance point determining device determines the subject vehicle to be located at the traveling guidance point. The traveling guiding device performs a traveling guidance by using the changing object as a target object of the traveling guidance.

17 Claims, 6 Drawing Sheets

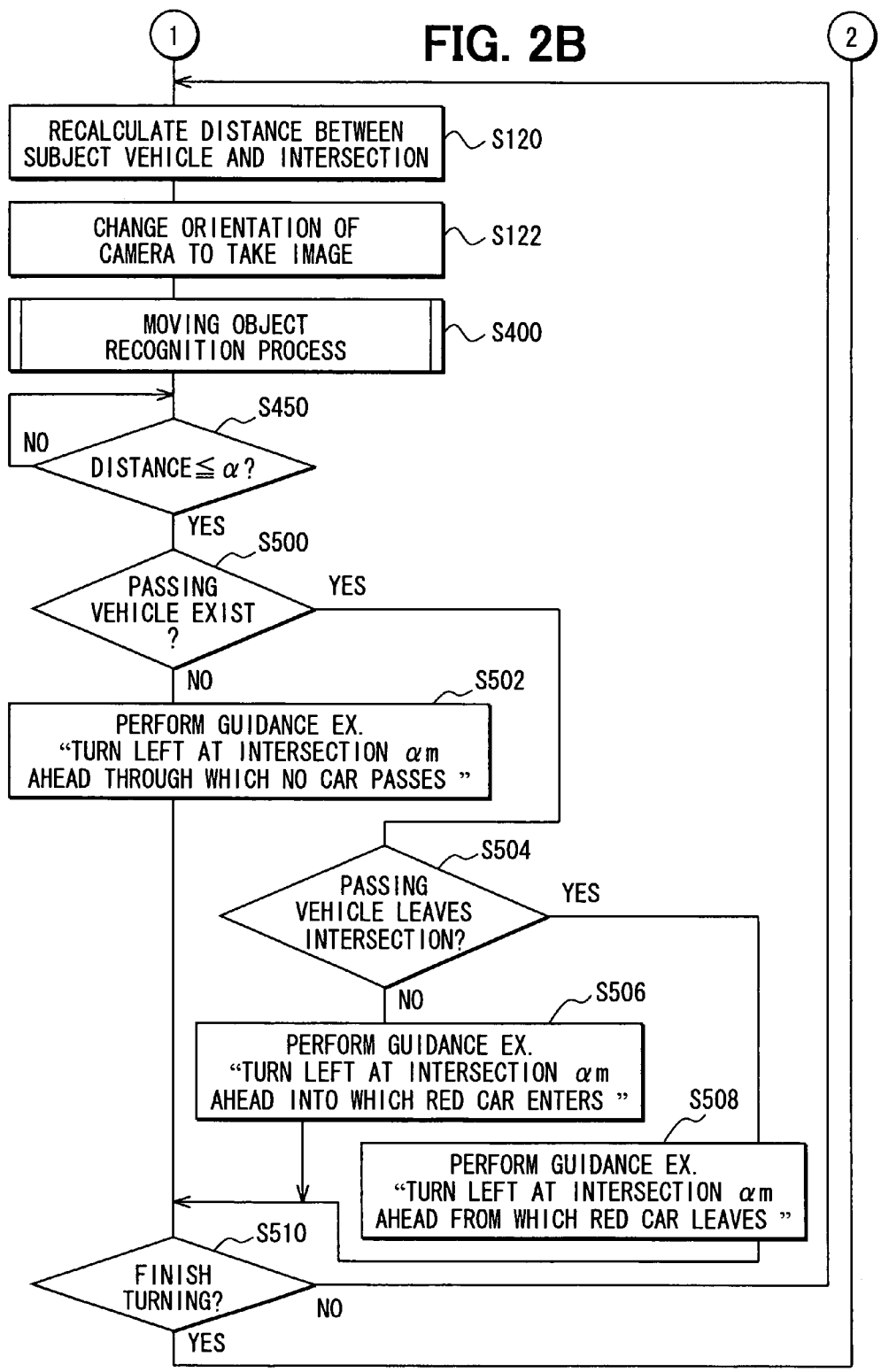

VEHICLE NAVIGATION APPARATUS AND METHOD

CROSS REFERENCE TO RELATED APPLICATION

This application is based on Japanese Patent Application No. 2006-253058 filed on Sep. 19, 2006, the disclosure of which is incorporated herein by reference in its entirety.

BACKGROUND OF THE INVENTION

1. Field of the Invention

The present invention relates to a vehicle navigation apparatus and a vehicle navigation method.

2. Description of Related Art

A navigation apparatus is disposed on a vehicle, and performs voice guidance when the vehicle comes closer to a guidance intersection to be guided. For example, the voice guidance represents distance information and a turning direction (e.g., left or right), so that the navigation apparatus provides the voice guidance such as "turn right 100 m ahead" or "turn right 20 m ahead". However, it is difficult for a driver of the vehicle to precisely recognize a distance from the vehicle to the guidance intersection. If plural intersections successively exist in front of the vehicle, the vehicle may turn left or right at a wrong intersection, which is different from the guidance intersection. Further, if the driver of the vehicle keeps close watch on a display of the navigation apparatus, the driver may not pay sufficient attention to a situation in front of the vehicle.

JP-A-2005-241653 discloses a navigation apparatus having a camera, which takes an image (picture) adjacent to the vehicle when the vehicle turns left or right. The image is separated into plural objects by using image recognition, and the navigation apparatus performs guidance by using the objects.

In contrast, when a passenger of the vehicle performs guidance for the driver, the passenger may use a changing object as a target object. For example, the passenger says, "turn left at a next intersection from which a red car leaves" or "move to a traveling lane in which a white foregoing car is traveling on your left".

However, because the navigation apparatus disclosed in JP-A-2005-241653 takes a stationary (nonmoving) image through the camera, the apparatus cannot detect the changing object. That is, the apparatus cannot perform guidance by using the changing object as the target object.

SUMMARY OF THE INVENTION

In view of the foregoing and other problems, it is an object of the present invention to provide a vehicle navigation apparatus using a changing object as a target object.

According to a first example of the present invention, a vehicle navigation apparatus includes an imaging device, a guidance point determining device, an object detecting device and a traveling guiding device. The imaging device takes an image of a periphery adjacent to a subject vehicle. The guidance point determining device determines the subject vehicle to be located at a traveling guidance point or not. The object detecting device detects a changing object by comparing two images of the periphery taken by the imaging device at a predetermined interval, when the guidance point determining device determines the subject vehicle to be located at the traveling guidance point. The traveling guiding device performs a traveling guidance by using the changing object detected by the object detecting device as a target object of the traveling guidance.

According to a second example of the present invention, a vehicle navigation method includes an imaging, a determining, a detecting and a performing. In the imaging, an image of a periphery adjacent to a subject vehicle is taken. In the determining, the subject vehicle is determined to be located at a traveling guidance point or not. In the detecting, a changing object is detected by comparing two images of the periphery taken at a predetermined interval, when the subject vehicle is determined to be located at the traveling guidance point. In the performing, a traveling guidance is performed by using the changing object as a target object of the traveling guidance.

BRIEF DESCRIPTION OF THE DRAWINGS

The above and other objects, features and advantages of the present invention will become more apparent from the following detailed description made with reference to the accompanying drawings. In the drawings:

FIGS. 2A and 2B are flow charts showing operation of a controller of the vehicle navigation apparatus;

DETAILED DESCRIPTION OF PREFERRED EMBODIMENT

Figure 1:
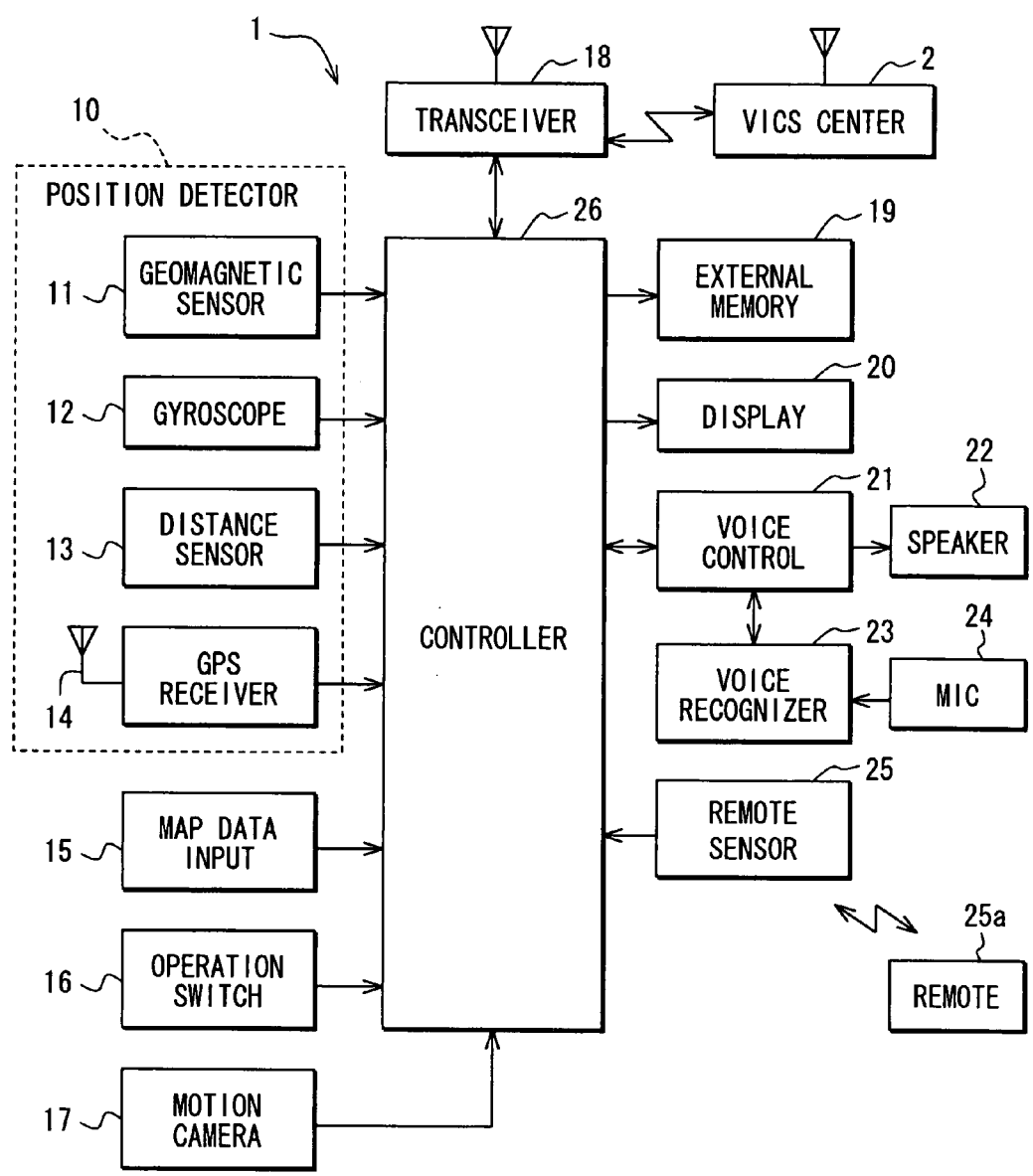
FIG. 1 is a block diagram showing a vehicle navigation apparatus according to an embodiment of the present invention.

A navigation apparatus 1 is disposed on a subject vehicle (SV), and as shown in FIG. 1, the navigation apparatus 1 includes a position detector 10, a map data input device 15, an operation switch 16, a motion camera 17 (imaging device), a transceiver 18, an external memory 19, a display 20, a voice control 21, a speaker 22, a voice recognition device 23, a microphone 24, a remote control sensor 25 and a controller 26.

The position detector 10 includes a geomagnetic sensor 11, a gyroscope 12, a distance sensor 13 and a global positioning system (GPS) receiver 14, which are known. The position detector 10 outputs data to be used for pinpointing a present position of the subject vehicle into the controller 26. The data are based on characteristics of the geomagnetic sensor 11, the gyroscope 12, the distance sensor 13 and the GPS receiver 14.

The map data input device 15 is constructed with a drive for a hard disk drive (HDD), DVD-ROM or CD-ROM, and is capable of reading map data from a map data source (not shown), e.g., HDD, DVD-ROM media or CD-ROM media. The map data source has a variety of data, e.g., road map, landmark, and map matching data for improving position detection accuracy. The data of the road map includes a road shape, road width, road name, building name, facility name, telephone number relative to the facility name, place name, geographic feature, and data to be used for a playback of the road map on the display 20.

The operation switch 16 is constructed with a touch-sensitive switch on the display 20, or a mechanical switch disposed adjacent to the display 20. The operation switch 16 outputs a signal corresponding to an operation by a user of the navigation apparatus.

The motion camera 17 takes a moving image adjacent to the subject vehicle, and outputs the moving image into the controller 26. The motion camera 17 includes a driving mechanism for changing a shooting direction of the motion camera 17 upward, downward, leftward or rightward in response to a control signal output from the controller 26. Due to the driving mechanism, the shooting direction of the motion camera 17 can be controlled.

The transceiver 18 sends or receives data with a vehicle information communication system (VICS) center 2 via an on-road device disposed along a road. The transceiver 18 receives traffic jam information or traffic control information from the VICS center 2, and outputs the received information into the controller 26. The transceiver 18 sends vehicle information or user information into the VICS center 2.

The external memory 19 is disposed outside of the controller 26, and stores a variety of data therein. The display 20 is made of a full-color liquid crystal, for example. The display 20 displays an image corresponding to an image signal input from the controller 26.

The voice control 21 outputs a recognition result of the voice recognition device 23 into the controller 26, and outputs a voice signal input by the controller 26 into the speaker 22. The voice control 21 performs a talk back output (voice output) through the speaker 22. Specifically, the voice control 21 outputs a voice corresponding to a voice signal input from the microphone 24.

The voice recognition device 23 compares the voice signal input from the microphone 24 with vocabulary data (comparison object pattern) stored in a recognition dictionary (not shown), in order to perform voice recognition. The voice recognition device 23 inputs a result of the voice recognition into the voice control 21.

The remote control sensor 25 receives a radio signal from a remote control 25a, and outputs the received signal into the controller 26. The remote control 25a sends the radio signal by using infrared rays, in response to an operation by a user of the subject vehicle.

The controller 26 is constructed with a computer having a CPU, an internal memory and the like. The CPU of the controller 26 performs a variety of calculations in accordance with a program stored in the internal memory of the controller 26.

The controller 26 performs a position calculation, a map display, a route searching, a traveling guidance, an image storing and the like. In the position calculation, a position of the subject vehicle having the navigation apparatus 1 is calculated based on a signal input from the position detector 10. In the map display, map data are read from the map data input device 15, and a subject vehicle mark representing the position of the subject vehicle is displayed on the map data. In the route searching, the most appropriate route from a present position to a destination is searched by using a Dijkstra method, for example, to provide a guidance route. In the traveling guidance, a traveling guidance is performed in accordance with the provided guidance route. In the image storing, moving images taken by the motion camera 17 are stored in the external memory 19.

After the route searching is performed, a position (latitude and longitude) of a guidance intersection, at which the subject vehicle is to be turned, and lane data representing the number of lanes in the guidance route are stored in the external memory 19. Further, the moving image stored in the external memory 19 is constructed with plural successive images.

Next, an operation of the controller 26 will be described with reference to FIGS. 2A and 2B. When an ignition switch of the subject vehicle is turned on to make the navigation apparatus 1 to be supplied with electricity from a battery, the navigation apparatus 1 starts operating. Then, the controller 26 starts the operation shown in FIGS. 2A and 2B, parallel to the variety of processes such as the position calculation or the map display.

Figure 2A:
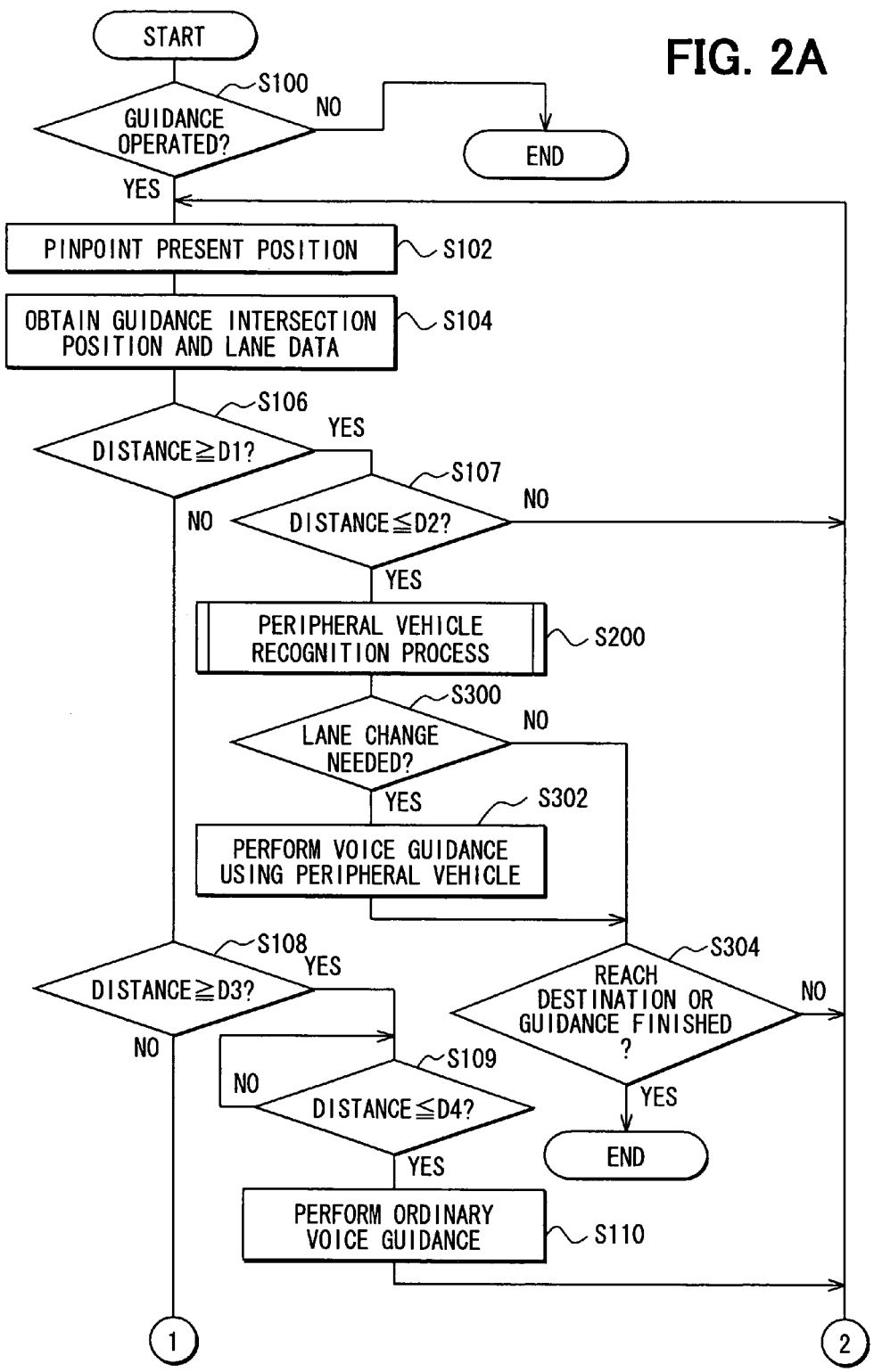

At S100 in FIG. 2A, the route guidance is determined to be in operation or not. Specifically, the route searching or the traveling guidance is determined to being performed or not in response to an operation by the user of the subject vehicle.

When the route guidance is determined not to be in operation (NO at S100), this operation by the controller 26 is finished. When the route guidance is determined to be in operation (YES at S100), a present position of the subject vehicle is pinpointed based on a position calculated in the position calculation, at S102.

At S104, the controller 26 obtains the guidance intersection position and the lane data. Specifically, the guidance intersection position and the lane data are read from the external memory 19.

At S106, a distance from the present position to the guidance intersection position is determined to be too far or not. Specifically, the distance from the present position to the guidance intersection position is determined to be equal to or larger than a first predetermined distance D1, e.g., 1 km, or not.

Here, when the distance from the present position to the guidance intersection position is determined to be equal to or larger than the first predetermined distance D1 (YES at S106), the distance from the present position to the guidance intersection position is determined to be equal to or smaller than a second predetermined distance D2, e.g., 3 km, or not, at S107.

When the distance from the present position to the guidance intersection position is determined to be larger than the second predetermined distance D2 (NO at S107), the controller 26 returns to S102. When the distance from the present position to the guidance intersection position is determined to be equal to or smaller than the second predetermined distance D2 (YES at S107), a peripheral vehicle recognition process is performed at S200.

In the peripheral vehicle recognition process, a peripheral vehicle traveling adjacent to the subject vehicle in the same direction as the subject vehicle is recognized. Then, lane guidance for instructing a traveling lane change is performed relative to the subject vehicle by using the peripheral vehicle as a target object.

Figure 3:
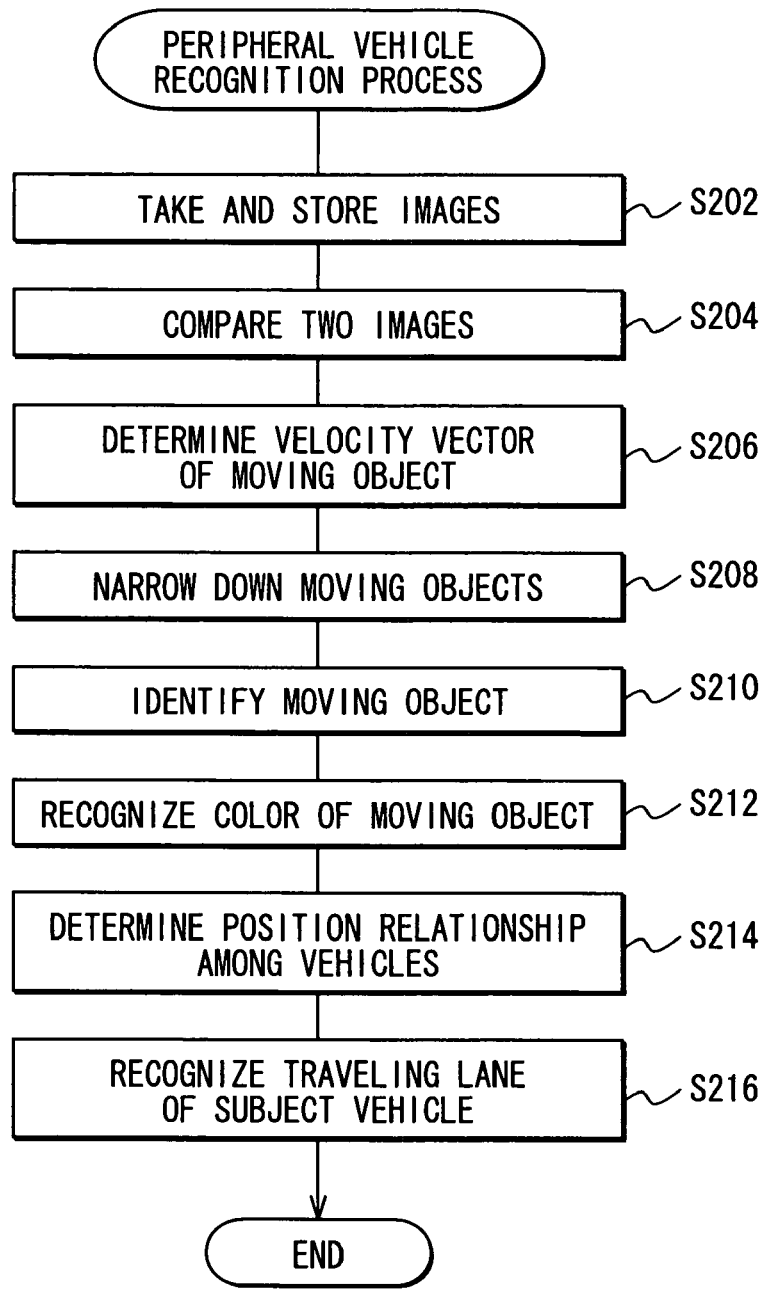
FIG. 3 is a flow chart showing a peripheral vehicle recognition process.

As shown of the flow chart of the peripheral vehicle recognition process in FIG. 3, the motion camera 17 takes an image of a forward intersection, and inputs the image into a memory, at S202. Specifically, the motion camera 17 takes a moving image in front of the subject vehicle, and a predetermined amount X (seconds) of the moving image is stored in the external memory 19.

At S204, an image taken Δt (Δt<X) seconds before and a present image are extracted from the memory, and compared with each other. Specifically, an image taken Δt (e.g., 0.01) seconds before and a latest image are extracted from the external memory 19, and compared with each other.

At S206, a velocity vector of a moving object is determined by comparing the images. Here, the determination of the velocity vector will be described with reference to FIG. 4.

Figure 4:
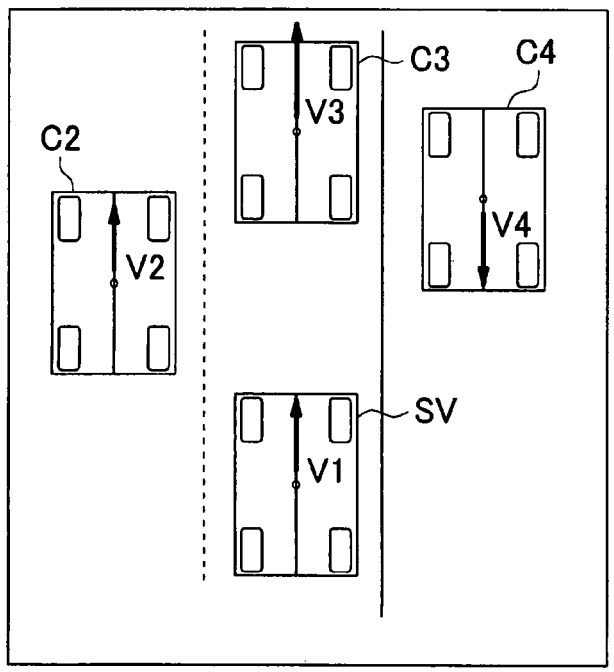
FIG. 4 is a diagram for explaining a calculation of a velocity vector.

A vehicle C2 and a vehicle C3 shown in FIG. 4 travel in a direction approximately the same as a subject vehicle SV, with a speed approximately the same as the subject vehicle SV. Therefore, a size of the vehicle C2, C3 is approximately the same between the image taken Δt seconds before and the present image. A relative velocity of the vehicle C2, C3 relative to the subject vehicle SV is approximately zero. Therefore, when the vehicles SV, C2, C3 are defined to have velocities V1, V2, V3, respectively, a velocity difference between the vehicles SV, C2 is represented by |V1−V2|=0, and a velocity difference between the vehicles SV, C3 is represented by |V1−V3|=0.

Because the velocity V1 of the subject vehicle SV is known, the velocity V2 of the vehicle C2 is approximately equal to the velocity V1 of the subject vehicle SV (V2=V1), and the velocity V3 of the vehicle C3 is approximately equal to the velocity V1 of the subject vehicle SV (V3=V1). Thus, the velocity vector of the vehicle C2, C3 can be determined, because a moving direction of the vehicle C2, C3 is similar to that of the subject vehicle SV.

Further, a vehicle C4 shown in FIG. 4 travels in a direction opposite to the moving direction of the subject vehicle SV, because the vehicle C4 travels in an opposite (oncoming) lane. Therefore, a present image of the vehicle C4 is larger than an image of the vehicle C4 taken Δt seconds before. When the vehicle C4 has a velocity V4, a velocity difference between the vehicles SV, C4 is defined by |V1+V4|. The velocity vector of the vehicle C4 can be determined, because a moving direction of the vehicle C4 is opposite to that of the subject vehicle SV.

Further, a present image of an on-road structure is larger than an image of the on-road structure taken Δt seconds before. A velocity difference between the subject vehicle SV and the on-road structure is defined by |V1|. The velocity vector of the on-road structure can be determined, because a moving direction of the on-road structure is opposite to that of the subject vehicle SV.

Thus, a velocity vector of a certain moving object (e.g., peripheral vehicle or on-road structure) can be determined by comparing the image taken Δt seconds before and the present image.

Next, at S208 in FIG. 3, the moving objects are narrowed down to plural types based on the velocity vector. Specifically, a moving object moving in the same direction and with the same velocity is selected, and the on-road structure and the oncoming vehicle traveling in the opposite lane are excluded from the moving objects.

At S210, the moving object is identified by using a pattern matching. Shape patterns of objects, e.g., car, truck, motor bike, bicycle, traffic signal and human, seen from a variety of directions (front, back, left and right) are stored in the external memory 19, and the pattern matching is performed by using these shape patterns.

At S212, a color of the moving object is recognized. For example, the moving object is recognized to be in red when the moving object is in red, or the moving object is recognized to be in white when the moving object is in white. The recognition of the color can be realized by a pattern matching using a neural network, for example.

At S214, a position relationship among the vehicles is determined. Specifically, a position relationship among vehicles in a periphery of the subject vehicle is determined based on positions of the vehicles in the image. For example, a vehicle located at an approximately center position of the image can be determined to travel in the same lane as the subject vehicle, or a vehicle located at a left side of the image can be determined to travel in a left side lane.

At S216, a traveling lane of the subject vehicle is recognized. When a centerline exists between the subject vehicle SV and the vehicle C4 traveling in the opposite lane (see FIG. 4), for example, the traveling lane of the subject vehicle can be recognized based on a distance between the subject vehicle and the centerline. The distance between the subject vehicle and the centerline can be experimentally calculated based on a position relationship between the subject vehicle and the centerline shown in the image.

Alternatively, the traveling lane of the subject vehicle may be recognized by calculating the present position of the subject vehicle with a high accuracy based on a signal input from the position detector 10, for example.

Next, at S300 in FIG. 2A, a lane change is determined to be need or not. Specifically, the lane change is determined to be need or not based on the lane data representing a lane in which the subject vehicle is to be traveling, which is provided at S104 in FIG. 2A, and the traveling lane of the subject vehicle recognized at S216 in FIG. 3.

For example, in a case where the guidance route is set such that the subject vehicle is to move to a left turn lane, when the subject vehicle is traveling in a lane different from the left turn lane, the lane change is determined to be need (YES at S300). Then, at S302, voice guidance is performed by using the peripheral vehicle as a target object of the voice guidance. For example, the speaker 22 outputs voice such as "move to a left turn lane at back of a white vehicle on your left".

At S304, the subject vehicle is determined to reach the destination or not, or route guidance is determined to be finished or not. When the subject vehicle is determined not to reach the destination (NO at S304), the controller 26 returns to S102. When the subject vehicle is determined to reach the destination (YES at S304), this operation by the controller 26 is finished.

Further, after the guidance intersection position and the lane data are provided at S104, when the distance from the present position to the guidance intersection position is determined to be smaller than the first predetermined distance D1, e.g., 1 km (NO at S106), the distance from the present position to the guidance intersection position is determined to be a little far or not, at S108. Specifically, the distance from the present position to the guidance intersection position is determined to be equal to or larger than a third predetermined distance D3, e.g., 500 m, or not.

Here, when the distance from the present position to the guidance intersection position is determined to be equal to or larger than the third predetermined distance D3 (YES at S108), the distance from the present position to the guidance intersection position is determined to be equal to or smaller than a fourth predetermined distance D4, e.g., 700 m, or not, at S109.

When the distance from the present position to the guidance intersection position is determined to larger than the fourth predetermined distance D4 (NO at S109), the controller 26 repeats the determination at S109. When the distance from the present position to the guidance intersection position is determined to be equal to or smaller than the fourth predetermined distance D4 (YES at S109), ordinary voice guidance is performed at S110. Specifically, a distance to the guidance intersection and a direction to which the subject vehicle is to be turned are guided. For example, the speaker 22 outputs voice such as "turn left at an intersection 700 m ahead", and the controller 26 returns to S102.

When the distance from the present position to the guidance intersection position is determined to be smaller than the third predetermined distance D3 (NO at S108), a distance between the subject vehicle and the guidance intersection is calculated again, due to navigation function, at S120. Specifically, the position of the subject vehicle is recalculated by the position calculation, and the distance between the subject vehicle and the guidance intersection is recalculated.

Figure 5:
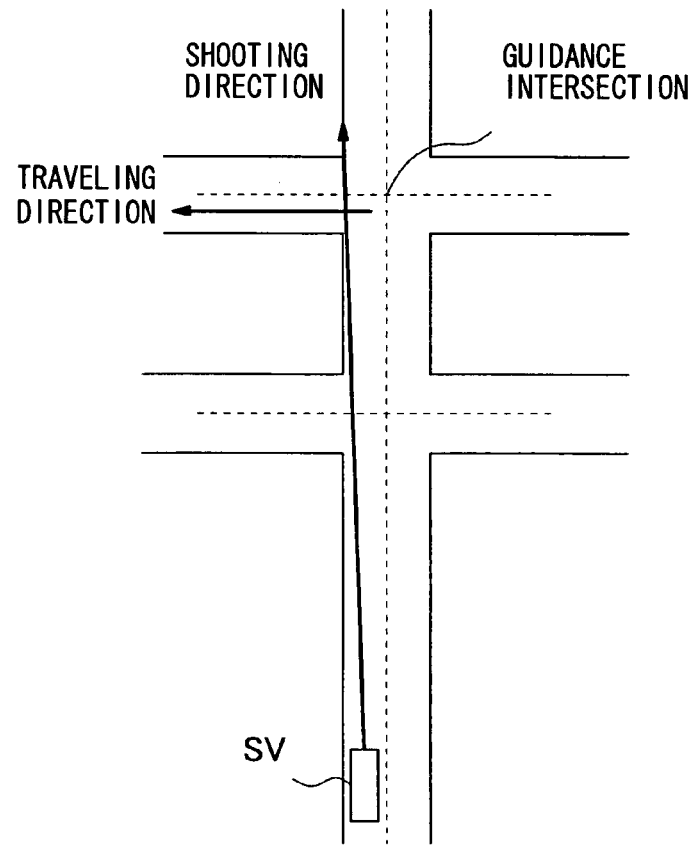
FIG. 5 is a diagram for explaining a shooting direction of a motion camera.

At S122, an orientation of the motion camera 17 is changed toward a traveling (exit) direction of the subject vehicle at the guidance intersection. Thus, the motion camera 17 takes an image of a peripheral situation adjacent to the guidance intersection, at which the subject vehicle turns to the traveling direction. For example, as shown in FIG. 5, when the subject vehicle is to turn left at the guidance intersection, the shooting direction of the motion camera 17 is made to oppose to a left side of a straight direction. In contrast, when the subject vehicle is to turn right at the guidance intersection, the shooting direction of the motion camera 17 is made to oppose to a right side of the straight direction. A moving angle of the orientation of the motion camera 17 to left or right is predetermined in an experiment.

At S400 in FIG. 2B, a moving object recognition process is performed, in which an object moving through the guidance intersection is recognized in order to perform intersection guidance for instructing a turning direction of the subject vehicle.

Figure 6:
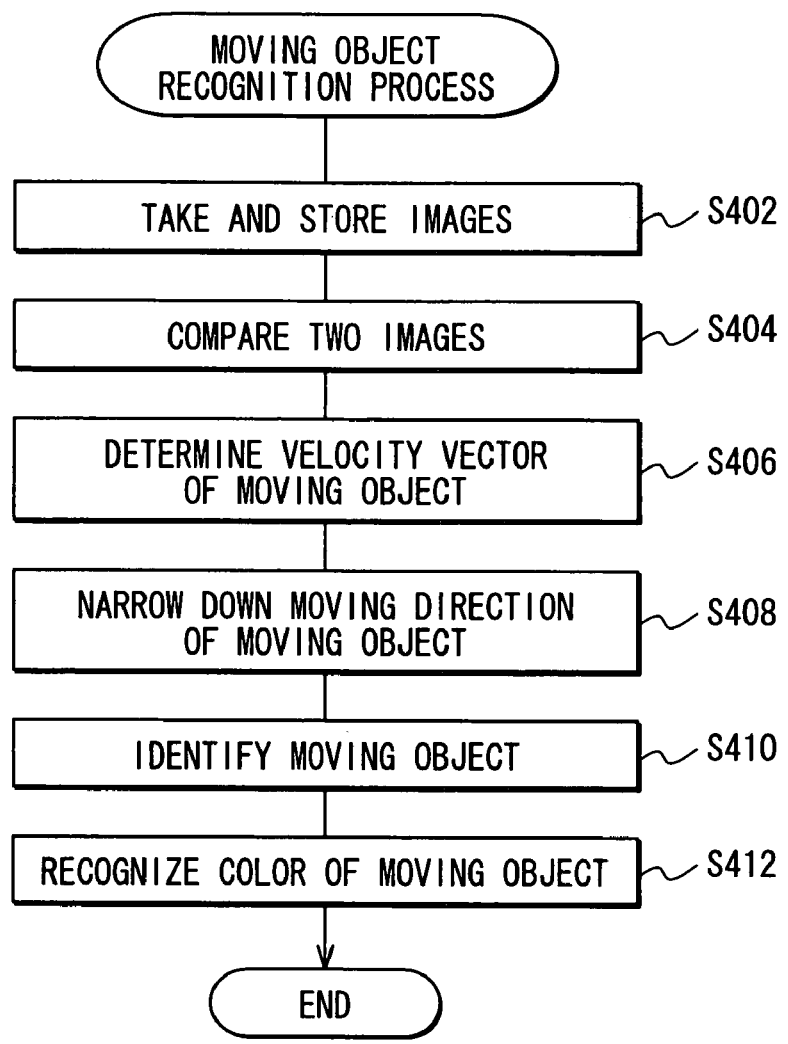
FIG. 6 is a flow chart showing a moving object recognition process.

As shown of S402 in FIG. 6, the motion camera 17 takes image of the guidance intersection, and the image is stored in a memory. Then, at S404, the image taken $\Delta t$ ($\Delta t<X$) seconds before and the present image are extracted from the memory, and compared with each other.

At S406, a velocity vector of the moving object is determined by comparing the images. The velocity vector of the peripheral vehicle is calculated at S206 in FIG. 3. Here, the moving object moves in a direction approximately perpendicular to a traveling direction of the subject vehicle. Specifically, a moving amount of the moving object in the direction approximately perpendicular to the traveling direction of the subject vehicle is determined by comparing the images. The moving amount is divided by the time period $\Delta t$ (seconds) to provide a moving velocity of the moving object. The moving amount can be experimentally calculated based on a variation of the position of the moving object between the image taken $\Delta t$ ($\Delta t<X$) seconds before and the present image. Further, the moving direction of the moving object is determined based on the variation of the position of the moving object between the image taken $\Delta t$ ($\Delta t<X$) seconds before and the present image. Thus, the moving velocity and the moving direction of the moving object are determined to provide the velocity vector of the moving object.

At S408, the moving direction of the moving object is narrowed down based on the velocity vector of the moving object. Specifically, the moving object moving in the direction approximately perpendicular to the traveling direction of the subject vehicle is determined to exist or not based on the images. When the moving object is determined to exist, the moving object is determined to move toward a left side or right side of the guidance intersection.

At S410, the moving object is identified by using the pattern matching. At S412, a color of the moving object is recognized. At S450 in FIG. 2B, a distance between the subject vehicle and the guidance intersection is determined to be equal to or smaller than a predetermined value $\alpha$, e.g., 10 m, or not. When the distance between the subject vehicle and the guidance intersection is determined to be larger than the predetermined value $\alpha$ (NO at S450), S450 is repeatedly performed.

When the distance between the subject vehicle and the guidance intersection is determined to be equal to or smaller than the predetermined value $\alpha$ (YES at S450), a vehicle passing through the guidance intersection is determined to exist or not based on a result of an image processing, at S500. Specifically, because the moving object moving in the direction approximately perpendicular to the traveling direction of the subject vehicle is determined to exist or not at S408 in FIG. 6, the vehicle passing through the guidance intersection is determined to exist or not based on the determination at S408.

When the passing vehicle, which moves in the direction approximately perpendicular to the traveling direction of the subject vehicle, is detected (YES at S500), the passing vehicle is determined to leave the guidance intersection or to enter the guidance intersection, at S504. Specifically, the passing vehicle is determined to leave the guidance intersection or to enter the guidance intersection based on the velocity vector (moving direction) of the moving object provided at S406 in FIG. 6.

Here, when the passing vehicle enters the guidance intersection (NO at S504), guidance is performed in accordance with the distance between the subject vehicle and the guidance intersection by using the passing vehicle, at S506. For example, the speaker 22 outputs voice such as "turn left at an intersection $\alpha$m ahead into which a red car enters", and the controller 26 proceeds to S510.

In contrast, when the passing vehicle leaves the guidance intersection (YES at S504), guidance is performed in accordance with the distance between the subject vehicle and the guidance intersection by using the passing vehicle, at S508. For example, the speaker 22 outputs voice such as "turn left at an intersection am ahead from which a red car leaves", and the controller 26 proceeds to S510.

Further, when the passing vehicle, which moves in the direction approximately perpendicular to the traveling direction of the subject vehicle is not detected (NO at S500), guidance is performed in accordance with the distance between the subject vehicle and the guidance intersection, at S502. For example, the speaker 22 outputs voice such as "turn left at an intersection am ahead through which no car passes", and the controller 26 proceeds to S510.

At S510, the subject vehicle is determined to finish the turning or not based on the position of the subject vehicle. When the subject vehicle is not located in an exit part of the guidance intersection (NO at S510), the controller 26 returns to S120. When the subject vehicle is located in the exit part of the guidance intersection (YES at S510), the controller 26 returns to S102. When the subject vehicle reaches the destination (YES at S304 in FIG. 2A), the operation by the controller 26 is finished.

According to this embodiment, when the subject vehicle is determined to be located at a guidance point, two images adjacent to the subject vehicle taken at a predetermined interval are compared with each other. Thereby, a changing object is detected, in which a condition (state) of the changing object is changed between the two images, and a traveling guidance is performed by using the changing object as a target object for the traveling guidance. That is, the changing object adjacent to the subject vehicle can be used as the target object to perform the traveling guidance. In addition, the predetermined interval may be constant or variable.

Further, in the traveling guidance, a turning direction or a traveling lane can be guided for the subject vehicle by using the changing object as the target object. Further, the changing object can be identified due to the pattern matching, so that the traveling guidance can be performed in a state that the changing object is indicated. Further, because a color of the changing object is indicated, the traveling guidance can be performed in detail. Further, because the moving direction of the moving object is indicated, the traveling guidance can be performed in detail. Further, because the moving object is detected as the changing object, a peripheral passing vehicle or walking pedestrian can be detected, for example. Therefore, the passing vehicle or the walking pedestrian can be used as the target object. Further, an object, a color of which is changed, is detected as the changing object. Therefore, for example, a traffic light (signal) can be used as the target object, because a color of the traffic signal turns green, yellow or red.

In the above embodiment, the peripheral vehicle traveling adjacent to the subject vehicle, the vehicle leaving the guidance intersection, or the vehicle entering the guidance intersection is used as the changing object, and guidance is performed by using the vehicle as the target object. Alternatively, a change of the color of the traffic light at the guidance intersection may be detected, and guidance may be performed such as "turn left at an intersection at which a traffic signal turns red now".

In the above embodiment, the changing object is used as the target object when the turning guidance or the traveling lane guidance is performed. Alternatively, the changing object may be used as the target object when other guidance is performed without departing from the scope of the present disclosure.

In the above embodiment, the image taken Δt seconds before and the present image are compared with each other at S200, and S400. Thereby, the velocity vector of the moving object is determined, and the moving object is detected by narrowing down the moving objects based on the velocity vector of the moving object. Alternatively, the moving object may be detected without determining the velocity vector.

In the above embodiment, the distance from the present position to the guidance intersection position is determined to be equal to or smaller than the second predetermined distance D2, e.g., 3 km, or not, at S107 in FIG. 2A. Alternatively, the second predetermined distance D2 may be one of 1 km, 3 km, 5 km and 10 km.

In the above embodiment, the distance from the present position to the guidance intersection position is determined to be equal to or smaller than the fourth predetermined distance D4, e.g., 700 m, or not, at S109 in FIG. 2A. Alternatively, the fourth predetermined distance D4 may be one of 300 m, 500 m and 700 m.

In the above embodiment, the distance from the present position to the guidance intersection position is determined to be equal to or smaller than the predetermined value α, e.g., 10 m, or not, at S450 in FIG. 2B. Alternatively, the predetermined value α may be one of 3 m, 5 m, 10 m, 20 m and 50 m.

Such changes and modifications are to be understood as being within the scope of the present invention as defined by the appended claims.

What is claimed is:

1. A vehicle navigation apparatus for use in a subject vehicle, comprising:
    an imaging device for taking an image of a periphery adjacent to the subject vehicle;
    a guidance point determining device for determining whether the subject vehicle is located at a traveling guidance point;
    an object detecting device for detecting a moving object by comparing two images of the periphery taken by the imaging device at a predetermined interval, when the guidance point determining device determines that the subject vehicle is located at the traveling guidance point; and
    a traveling guiding device for performing a traveling guidance by using the moving object detected by the object detecting device as a target object of the traveling guidance, wherein
    the object detecting device determines whether the detected moving object exists around an intersection,
    the object detecting device determines whether the detected moving object enters or leaves the intersection, when the object detecting device determines that the detected moving object exists around the intersection, and
    the traveling guidance device performs the traveling guidance by using the moving object entering or leaving the intersection, when the object detecting device determines that the detected moving object enters or leaves the intersection.

2. The vehicle navigation apparatus according to claim 1, wherein
    the guidance point determining device determines whether the subject vehicle is located at a right/left turning guidance point as the traveling guidance point, and
    the traveling guiding device performs a right/left turning guidance as the traveling guidance by using the moving object as the target object of the traveling guidance.

3. The vehicle navigation apparatus according to claim 1, wherein
    the guidance point determining device determines whether the subject vehicle is located at a traveling lane guidance point as the traveling guidance point, and
    the traveling guiding device performs a traveling lane guidance as the traveling guidance by using the moving object as the target object of the traveling guidance.

4. The vehicle navigation apparatus according to claim 1, wherein
    the object detecting device includes a pattern recognizing element for recognizing the moving object by using a pattern matching, and
    the traveling guiding device performs the traveling guidance by indicating the moving object recognized by the pattern recognizing element.

5. The vehicle navigation apparatus according to claim 1, wherein
    the object detecting device includes a color recognizing element for recognizing a color of the moving object, and
    the traveling guiding device performs the traveling guidance by indicating the color of the moving object recognized by the color recognizing element.

6. The vehicle navigation apparatus according to claim 1, wherein
    the object detecting device includes a moving direction determining element for determining a moving direction of the moving object moving in a direction approximately perpendicular to a traveling direction of the subject vehicle, and
    the traveling guiding device performs the traveling guidance by indicating the moving direction of the moving object determined by the moving direction determining element.

7. The vehicle navigation apparatus according to claim 1, wherein
    the imaging device takes a moving image as the image of the periphery adjacent to the subject vehicle,
    the object detecting device extracts two images taken at a predetermined interval among a plurality of images of the periphery taken by the imaging device as the moving image, and the object detecting device detects the moving object by comparing the two images.

8. The vehicle navigation apparatus according to claim 1, wherein
the moving object is a passing vehicle that moves in a direction approximately perpendicular to a traveling direction of the subject vehicle.

9. The vehicle navigation apparatus according to claim 1, wherein
the moving object is a pedestrian that moves in a direction approximately perpendicular to a traveling direction of the subject vehicle.

10. The vehicle navigation apparatus according to claim 1, wherein
the traveling guidance device performs the traveling guidance in accordance with a distance between the subject vehicle and the intersection.

11. The vehicle navigation apparatus according to claim 1, wherein the object detecting device further detects that the moving object is moving in a direction approximately perpendicular to a traveling direction of the subject vehicle instead of being stationary and instead of moving in a direction not approximately perpendicular to the traveling direction, so that the traveling guiding device uses the moving object that enters or leaves the intersection perpendicular to the traveling direction as the target object of the traveling guidance instead of a stationary object and instead of an object not moving approximately perpendicular to the traveling direction.

12. The vehicle navigation apparatus according to claim 1, wherein
the traveling guidance device performs the traveling guidance at the traveling guidance point for the subject vehicle that is driving through the traveling guidance point while the guidance point determining device is in operation.

13. The vehicle navigation apparatus according to claim 1, wherein
the traveling guidance device performs the traveling guidance instead of ordinary voice guidance, in the situation that the detected moving object is determined to exist around an intersection and the detected moving object is determined to enter or leave the intersection,
wherein the traveling guidance indicates the detected moving object that exists around the intersection.

14. A vehicle navigation method for use in a subject vehicle, comprising:
taking an image of a periphery adjacent to the subject vehicle, using an imaging device;
determining whether the subject vehicle is located at a traveling guidance point or not;
detecting a moving object by comparing two images of the periphery taken by the imaging device at a predetermined interval, when the subject vehicle is determined to be located at the traveling guidance point;
determining whether the detected moving object exists around an intersection;
determining whether the detected moving object enters or leaves the intersection, when the detected moving object is determined to exist around the intersection; and
performing a traveling guidance in a navigation device of the subject vehicle by using the moving object entering or leaving the intersection as a target object of the traveling guidance.

15. The vehicle navigation method according to claim 14, further comprising:
detecting that the moving object is moving in a direction approximately perpendicular to a traveling direction of the subject vehicle instead of being stationary and instead of moving in a direction not approximately perpendicular to the traveling direction; and
using the moving object that enters or leaves the intersection perpendicular to the traveling direction as the target object of the traveling guidance performed in the navigation device, instead of a stationary object and instead of an object not moving approximately perpendicular to the traveling direction.

16. The vehicle navigation method according to claim 14, wherein
the traveling guidance is performed at the traveling guidance point for the subject vehicle that is driving through the traveling guidance point when the subject vehicle is determined to be located at the traveling guidance point.

17. The vehicle navigation method according to claim 14, wherein
the traveling guidance is performed instead of ordinary voice guidance, in the situation that the detected moving object is determined to exist around an intersection and the detected moving object is determined to enter or leave the intersection,
wherein the traveling guidance indicates the detected moving object that exists around the intersection.

* * * * *